United States Patent
Devireddy et al.

(10) Patent No.: US 7,953,885 B1
(45) Date of Patent: May 31, 2011

(54) METHOD AND APPARATUS TO APPLY AGGREGATE ACCESS CONTROL LIST/QUALITY OF SERVICE FEATURES USING A REDIRECT CAUSE

(75) Inventors: Dileep Kumar Devireddy, San Jose, CA (US); Faisal Mushtaq, Santa Clara, CA (US); Shreeram Bhide, San Jose, CA (US); Herman Levenson, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 905 days.

(21) Appl. No.: 10/418,344

(22) Filed: Apr. 18, 2003

(51) Int. Cl.
*G06F 15/177* (2006.01)
*G06F 15/173* (2006.01)

(52) U.S. Cl. .... 709/238; 709/220; 709/240; 370/395.21

(58) Field of Classification Search .................. 709/238, 709/223, 224, 225, 226, 227, 228, 250, 229, 709/232, 240; 370/395.21, 235
See application file for complete search history.

(56) References Cited

U.S. PATENT DOCUMENTS

| | | | | |
|---|---|---|---|---|
| 6,009,097 A * | 12/1999 | Han | .......................... | 370/395.52 |
| 6,021,263 A * | 2/2000 | Kujoory et al. | ................ | 709/232 |
| 6,295,532 B1 * | 9/2001 | Hawkinson | ........................ | 707/4 |
| 6,631,135 B1 * | 10/2003 | Wojcik | ....................... | 370/395.21 |
| 6,674,756 B1 * | 1/2004 | Rao et al. | .................. | 370/395.21 |
| 6,970,921 B1 * | 11/2005 | Wang et al. | .................... | 709/220 |
| 2002/0016856 A1 * | 2/2002 | Tallegas et al. | ................ | 709/238 |
| 2002/0067729 A1 * | 6/2002 | Fukuda et al. | ............ | 370/395.21 |
| 2002/0089985 A1 * | 7/2002 | Wahl et al. | ................... | 370/395.1 |
| 2002/0118644 A1 * | 8/2002 | Moir | ........................... | 370/230.1 |
| 2002/0194369 A1 * | 12/2002 | Rawlins et al. | ................ | 709/238 |
| 2003/0056002 A1 * | 3/2003 | Trethewey | ..................... | 709/238 |

* cited by examiner

*Primary Examiner* — Philip J Chea
(74) *Attorney, Agent, or Firm* — Campbell Stephenson LLP

(57) ABSTRACT

A method and apparatus to apply aggregate ACL/QoS features using a redirect cause is disclosed. According to one embodiment of the present invention, a control processor configured to support a plurality of virtual interfaces is provided, wherein each of the plurality of virtual interfaces is associated with a quality of service level. According to another embodiment, each quality of service level is associated with a processing bandwidth of the control processor. According to yet another embodiment, a control processor interface is provided coupled to the control processor which is configured to select a virtual interface of the plurality of virtual interfaces using data of a received data unit, and to transfer the received data unit to the selected virtual interface.

30 Claims, 4 Drawing Sheets

METHOD AND APPARATUS TO APPLY AGGREGATE ACCESS CONTROL LIST/QUALITY OF SERVICE FEATURES USING A REDIRECT CAUSE

BACKGROUND OF THE INVENTION

1. Field of the Invention

The present invention relates to communications networks generally and more particularly to a method and apparatus to apply aggregate ACL/QoS features using a redirect cause.

2. Description of the Related Art

A conventional network element (e.g., switch, router, etc.) may include separate facilities or elements to perform various functions (e.g., switching/forwarding, routing, exception processing, and the like). For example, a typical router may perform packet switching using dedicated hardware (e.g., a forwarding engine) within one or more of a plurality of high-bandwidth line cards and perform more complex packet processing using software executing on a single or small number of centralized processors (e.g., one or more "route" or control processors).

A line card receiving a packet may, based on the packet's content, switch the packet to another line card or alternatively detect the need for additional processing (e.g., exception or IP options processing, packet consumption if the packet is destined for the router, etc.) and transfer the packet to memory associated with a control processor where it will be enqueued and eventually re-parsed and processed using software (e.g., express forwarding or process-level code). A packet may be redirected to a control processor as a result of a lookup (e.g., a forwarding information base (FIB) lookup or access control list (ACL) lookup) or due to an exception. Because the packet processing ability of control processors is limited, the current paradigm is to rate limit such packets before transferring them to control-processor-associated memory. Performing such rate limiting at multiple places may not be optimal in all scenarios.

Conventional networks and network elements may also provide any number of mechanisms for guaranteeing a particular quality of service (QoS) for a particular type of network traffic (e.g., traffic associated with a particular user, location, service, or application). QoS techniques may be classified into any of a number of categories including, relative priority marking, service marking, label switching, Integrated Services (IntServ)/RSVP, and static per-hop classification-type architectures. While providing a mechanism to ensure per-flow or aggregate QoS, existing QoS architectures suffer from a number of deficiencies (e.g., a lack of scalability, granularity, manageability, and/or policy control mechanisms).

Examples of the relative priority marking architecture include IPv4 precedence-marking (Postel, J., Editor, "Internet Protocol", STD 5, RFC 791, September 1981), 802.5 Token Ring priority (ISO/IEC 8802-5 Information technology—Telecommunications and information exchange between systems—Local and metropolitan area networks—Common specifications—Part 5: Token Ring Access Method and Physical Layer Specifications, (also ANSI/IEEE Std 802.5-1995), 1995), and the default interpretation of 802.1p traffic classes (ISO/IEC Final CD 15802-3 Information technology—Tele-communications and information exchange between systems—Local and metropolitan area networks—Common specifications—Part 3: Media Access Control (MAC) bridges). In the relative priority marking architecture, the application, host, or proxy node selects a relative priority or "precedence" for a packet (e.g., delay or discard priority), and the network nodes along the transit path apply the appropriate priority forwarding behavior corresponding to the priority value within the packet's header.

An example of a service marking architecture is IPv4 Type of Service (TOS) (Almquist, P., "Type of Service in the Internet Protocol Suite", RFC 1349, July 1992). In the TOS architecture, each packet is marked with a request for a "type of service", (e.g., "minimize delay", "maximize throughput", "maximize reliability", or "minimize cost"). Network nodes may then select routing paths or forwarding behaviors which are suitably engineered to satisfy the service request. The described TOS markings are very generic and do not span the entire range of possible service semantics. Furthermore, a service request is associated with each individual packet, whereas some service semantics may depend on the aggregate forwarding behavior of a sequence of packets. The service marking architecture does not easily accommodate growth in the number and range of future services (since the codepoint space is small) and involves configuration of a "TOS->forwarding behavior" association in each network node.

Examples of the label switching (or virtual circuit) architecture include Frame Relay, ATM, and MPLS (ANSI TISI, "DSSI Core Aspects of Frame Rely", March 1990 and ATM Traffic Management Specification Version 4.0<af-tm-0056.000>, ATM Forum, April 1996). In the label switching architecture, path forwarding state and traffic management or QoS state is established for traffic streams on each hop along a network path. Traffic aggregates of varying granularity are associated with a label switched path at an ingress node, and packets/cells within each label switched path are marked with a forwarding label that is used to lookup the next-hop node, the per-hop forwarding behavior, and the replacement label at each hop.

The label switching architecture permits finer granularity resource allocation to traffic streams, since label values are not globally significant but are only significant on a single link; therefore resources can be reserved for the aggregate of packets/cells received on a link with a particular label, and the label switching semantics govern the next-hop selection, allowing a traffic stream to follow a specially engineered path through the network. This improved granularity comes at the cost of additional management and configuration requirements to establish and maintain the label switched paths. In addition, the amount of forwarding state maintained at each node scales in proportion to the number of edge nodes of the network in the best case (assuming multipoint-to-point label switched paths), and scales in proportion with the square of the number of edge nodes in the worst case, when edge-edge label switched paths with provisioned resources are employed.

The Integrated Services (IntServ)/RSVP architecture relies upon traditional datagram forwarding in the default case, but allows sources and receivers to exchange signaling messages which establish additional packet classification and forwarding state on each node along the path between them (Braden, R., Clark, D. and S. Shenker, "Integrated Services in the Internet Architecture: An Overview", RFC 1633, July 1994 and Braden, B., Zhang, L., Berson S., Herzog, S. and S. Jamin, "Resource ReSerVation Protocol (RSVP)—Version 1 Functional Specification", RFC 2205, September 1997). The IntServ architecture utilizes an "RSVP" protocol to guarantee QoS at a flow granularity level between a source node and a destination node of a network. A flow (sometimes also referred to as a "microflow") is typically defined by a 5-Tuple comprising a source address, a destination address, a transport protocol, a source port number, and a destination port number.

According to the RSVP protocol, periodic messages between source and destination nodes are utilized to estimate and reserve available bandwidth for a particular flow. While the IntServ architecture integrates well with a policy infrastructure and provides fairly automatic QoS and flow-level granularity, the amount of overhead (e.g., state, signaling, classification, policing, queuing, and scheduling) required by the architecture can be significant where the network or the number of flows is large. In the absence of state aggregation, the amount of state on each node within a system implementing the IntServ architecture scales in proportion to the number of concurrent reservations, which can be large on high-speed links. The IntServ architecture also requires application support for the RSVP signaling protocol.

Similar to the previously-described 802.1p traffic class and TOS service marking architectures, the Differentiated Services (DiffServ, or DS) architecture (Nichols, K., Blake, S., Baker, F. and D. Black, "Definition of the Differentiated Services Field (DS Field) in the IPv4 and IPv6 Headers", RFC 2474, December 1998; and Blake, S., Black, D., Carlson, M., Davies, E., Wang, Z. and W. Weiss, "An Architecture for Differentiated Services", RFC 2475 December 1998) defines levels or "classes" of service and per-hop behaviors for packets transferred across a network using a differentiated services field within a packet's TOS (IPv4) or Traffic Class (IPv6) octet and a number of architecture modules (e.g., a classifier, meter, marker, scheduler, and a dropper). More specifically, the DiffServ architecture defines a Differentiated Services Codepoint (DSCP).

Aggregate QoS services are typically applied to all packets received at a control processor from all line cards. This allows a user to classify traffic based on both Behavioral Aggregate (BA) and Multifield (MF) classifiers. One major limitation of conventional QoS architectures therefore is that a user may only apply QoS policies based on a packet's 5-Tuple or BA causing packets which match the same class map to be treated identically.

SUMMARY OF THE INVENTION

Disclosed is a method and apparatus to apply aggregate ACL/QoS features based on the reason the packet was redirected (i.e., the "redirect cause"). Embodiments of the present invention allow a user to apply ACL/QoS policies on a control processor at a finer granularity than with previous architectures. According to one embodiment, a control processor configured to support a plurality of virtual interfaces is provided, wherein each of the plurality of virtual interfaces is associated with a quality of service level. According to another embodiment, each quality of service level is associated with a processing bandwidth of the control processor. According to yet another embodiment, a control processor interface is provided coupled to the control processor which is configured to select a virtual interface of the plurality of virtual interfaces using data of a received data unit, and to transfer the received data unit to the selected virtual interface.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one or more specific embodiments, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to embodiments of the present invention, QoS policies are applied on the basis of packet redirect causes such as exception class/type (e.g., time to live (TTL), maximum transfer unit (MTU), etc.), IP options, feature specific redirects like NAT, Firewall, etc.) allowing a user to apply ACL/

QoS policies on a control processor at a finer (e.g., exception-level) granularity and providing better aggregate control on all types of packets sent to the control processor than with conventional QoS architectures. According to one embodiment, two components are utilized to provided the described functionality, a first component implemented in a line card forwarding engine application-specific integrated circuit (ASIC) and a second component implemented in a control processor interface ASIC.

Figure 1:
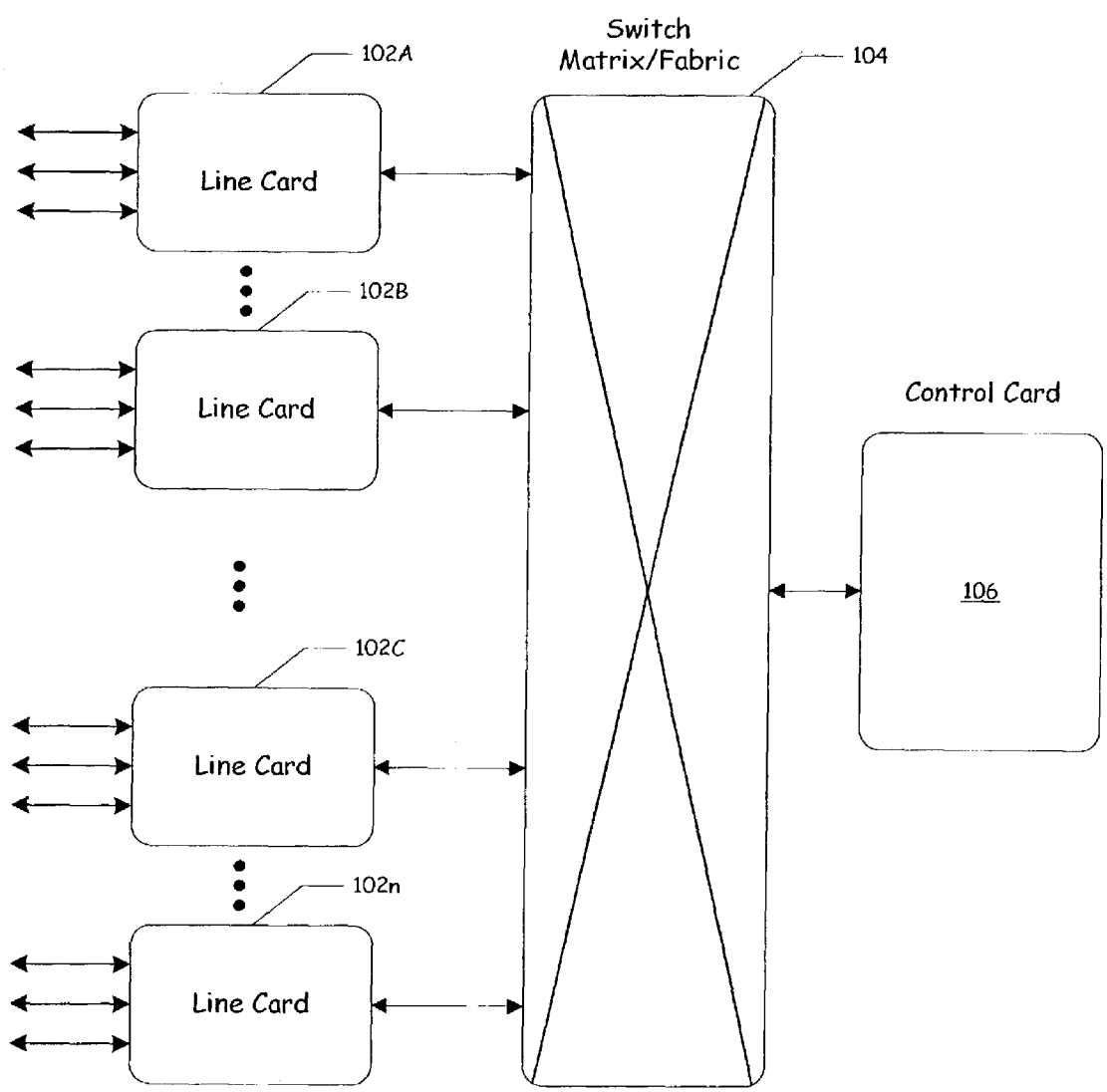
FIG. 1 illustrates a network element usable with one or more embodiments of the present invention.

FIG. 1 illustrates a network element usable with one or more embodiments of the present invention. In the present description, such a network element may alternatively be referred to as a "network node" or "node". A network element such as that depicted in FIG. 1 may comprise any element, entity, or connection point within a network. A network element within one or more embodiments of the present invention may include, for example, a redistribution point (e.g., a switch, router, or gateway) and/or an end point (e.g., a client or server) for data transmissions. The network element of FIG. 1 includes a number or plurality of line cards 102a-102n, a switch fabric 104 or "matrix", and a control card 106 coupled together as shown.

According to one embodiment, one or more of line cards 102a-102n are coupled with and transfer data units (e.g., packets, frames, cells, etc.) to and/or from one or more networks (not illustrated). Although bi-directional communication lines have been illustrated with respect to line cards 102a-102n, it should be appreciated that in alternative embodiments of the present invention, one or more unidirectional (e.g., egress or ingress) communication lines and/or line cards may be implemented. According to one embodiment, one or more of line cards 102a-102n comprise a line interface configured to determine a redirect cause of a received or "incoming" data unit.

According to another embodiment of the present invention, one or more of line cards 102a-102n comprise a line interface configured to modify a received data unit to include a redirect cause field value corresponding to a determined redirect cause. Line cards 102a-102n may either drop/discard a received data unit or transfer a received data unit either to another (e.g., outgoing) line card 102a-102n or to a control card 106 utilizing switch fabric 104. Control card 106 of the illustrated embodiment is responsible for additional data unit processing (e.g., maintaining routing tables, performing various routing computations or operations) and in one embodiment, includes a control processor having a plurality of virtual interfaces, wherein each of the plurality of virtual interfaces is associated with a quality of service level with respect to an operating bandwidth or capacity of the control processor.

Figure 2:
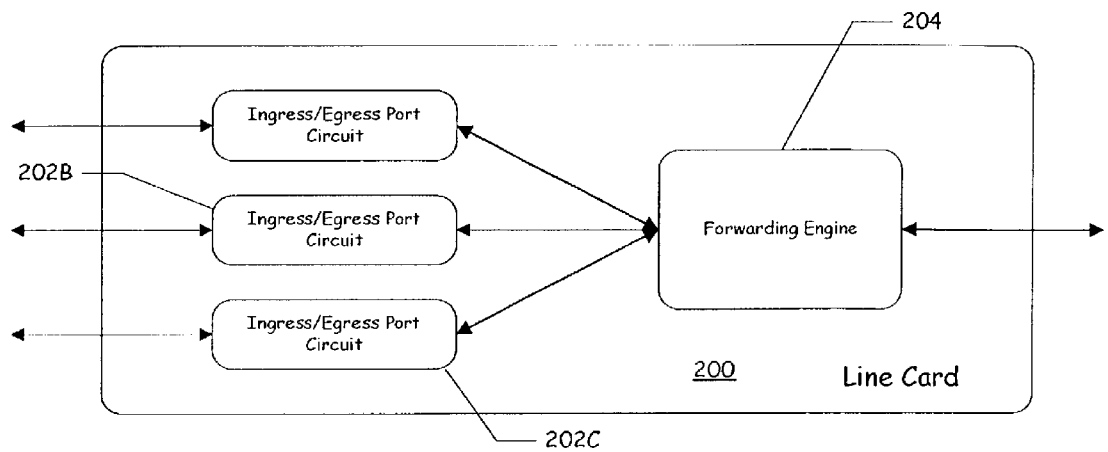
FIG. 2 illustrates an exemplary line card usable with one or more embodiments of the present invention.

FIG. 2 illustrates an exemplary line card usable with one or more embodiments of the present invention. In the illustrated embodiment, the depicted line card 200 includes a plurality of ingress/egress port circuits 202a-202c (e.g., line interface units 'LIUs' or the like) coupled with a forwarding engine 204 as shown. While a fixed number of ingress/egress port circuits 202a-202c and only a single forwarding engine 204 have been illustrated in the exemplary embodiment of FIG. 2, it should be appreciated that variations from the number of components depicted are contemplated by alternative embodiments of the present invention. Ingress/egress port circuits 202a-202c may each be coupled to one or more links (e.g., wires, optical fibers, etc.) on one or more networks (not illustrated) and may each receive one or more data units.

According to one embodiment, ingress/egress port circuits 202a-202c transfer data units between the described one or more networks and forwarding engine 204, converting the described data units between data link and network or "transport-level" representations as necessary. Forwarding engine 204 of the illustrated embodiment in turn transfers data units between a switch fabric (not illustrated) such as switch fabric 104 described with respect to FIG. 1, and ingress/egress port circuits 202a-202c. According to one embodiment of the present invention, forwarding engine 204 additionally determines a received data unit's redirect cause and appends or otherwise adds a redirect cause field value to the header of the received, control-processor-destined, data unit.

Figure 3:
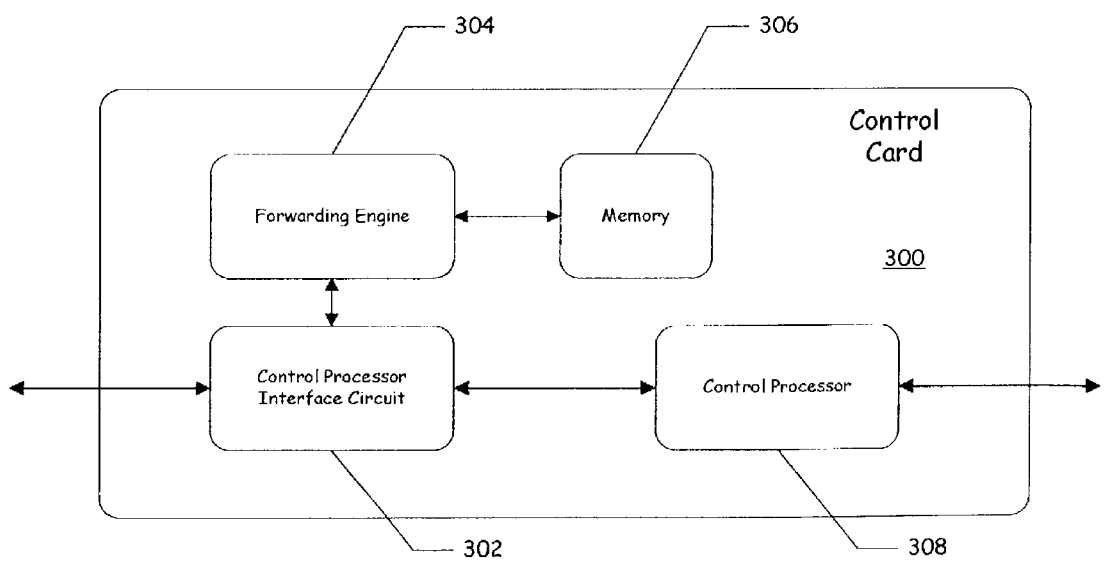
FIG. 3 illustrates an exemplary control card useable with one or more embodiments of the present invention.

FIG. 3 illustrates an exemplary control card useable with one or more embodiments of the present invention. In the depicted embodiment, control card 300 includes a control processor interface circuit 302, a forwarding engine 304, a memory 306, and a control processor 308. According to one embodiment of the present invention, control processor 308 includes a plurality of virtual interfaces, wherein each of the plurality of virtual interfaces is associated with a quality of service level with respect to an operating bandwidth or capacity of control processor 308. In another embodiment of the present invention, control processor interface circuit 302 is utilized to map a received redirect cause field value to a virtual interface and forwarding engine 304 and memory 306 are utilized as a lookup engine to perform an ACL/QoS lookup as described with respect to embodiments of the present invention herein. In an alternative embodiment, forwarding engine 304 and/or memory 306 may be omitted from control card 300 and the described ACL/QoS lookup may be performed using a line card such as line card 200 described with respect to FIG. 2.

Figure 4:
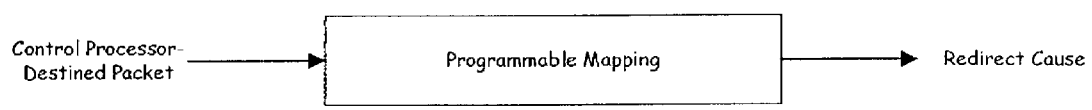
FIG. 4 illustrates a programmable mapping between a received control-processor-destined packet's data and a redirect cause and/or redirect cause field value according to an embodiment of the present invention.

FIG. 4 illustrates a programmable mapping between a received control-processor-destined packet's data and a redirect cause and/or redirect cause field value according to an embodiment of the present invention. According to one embodiment, the depicted mapping is performed using a line card forwarding engine such as forwarding engine 204 described with respect to FIG. 2 herein. According to another embodiment, the illustrated mapping is generated/mapped utilizing an exception flag (e.g., IP option, ICMP unreachable, MPLS FIB TCAM miss, Same interface, Unicast unknown protocol, Unicast RPF fail, Multicast RPF fail, Multicast DF fail, Multicast non-rpf, TTL expire, Reserved, Drop, ACL deny, Multicast FIB Redirect, Unicast FIB Redirect, ACL Redirect, IP header invalid, etc.) within a received, control-processor-destined packet. In the described embodiment, each exception flag is mapped or translated into an n-bit redirect cause value using a set of n 32-bit registers by partitioning the exceptions flags into mutually exclusive groups and encoding the various flags using minimal bits where n is an integer. According to one embodiment of the present invention n is equal to 12. The redirect cause value may then be appended/incorporated into the received packet as described herein to indicate an associated exception class/type, IP options, or feature. In yet another embodiment of the present invention, a redirect cause may also be appended/incorporated into each unsupported feature packet.

Figure 5:
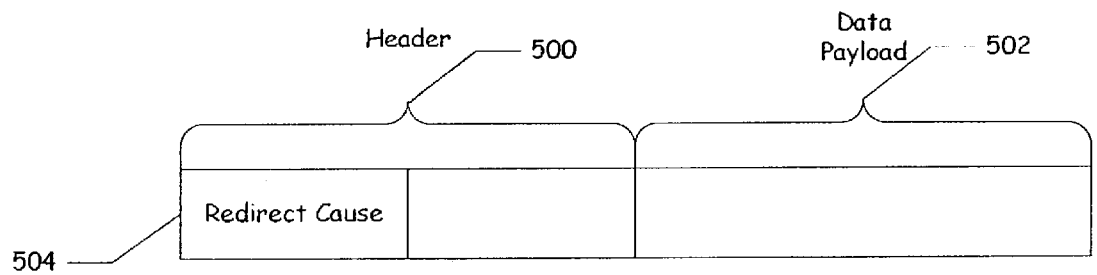
FIG. 5 illustrates a packet format according to an embodiment of the present invention.

FIG. 5 illustrates a packet format according to an embodiment of the present invention. The illustrated packet format includes a header 500 to store various control and administrative data and a data payload 502 to store data to be transmitted. In the illustrated embodiment, header 500 includes a redirect cause field 504 as described herein with respect to various embodiments of the present invention. While a particular arrangement, both of header 500 with respect to data payload 502 and of redirect cause field 504 within header 500 has bee illustrated, it should be appreciated that variations of the arrangement of the described elements is contemplated by alternative embodiments of the present invention. Additionally, the proportionate sizes of header 500, data payload 502, and redirect cause field 504 are intended to be illustrative of one embodiment of the present invention and may be varied in alternative embodiments.

Figure 6:
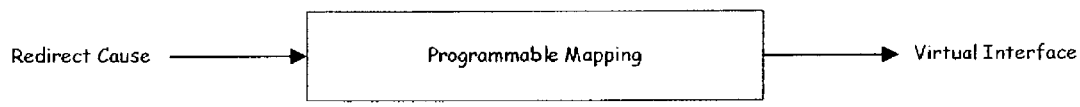
FIG. 6 illustrates a programmable mapping between a redirect cause and/or redirect cause field value and a virtual interface according to an embodiment of the present invention.

FIG. 6 illustrates a programmable mapping between a redirect cause and/or redirect cause field value and a virtual interface according to an embodiment of the present invention. According to one embodiment, the depicted mapping is performed using a control processor interface circuit such as control processor interface circuit 302 described with respect to FIG. 3 herein. The illustrated mapping, as well as any other described process, method, or portion thereof, may however be performed using any combination of hardware, firmware, and/or software. Exemplary redirect causes may include, in one or more embodiments: IP options, ICMP unreachable, FIB TCAM miss, ICMP redirect, TTL expire, MTU exception, Unicast RPF failure log, Sanity check failure, Router destined packets, and Unicast unknown protocols.

Figure 7:
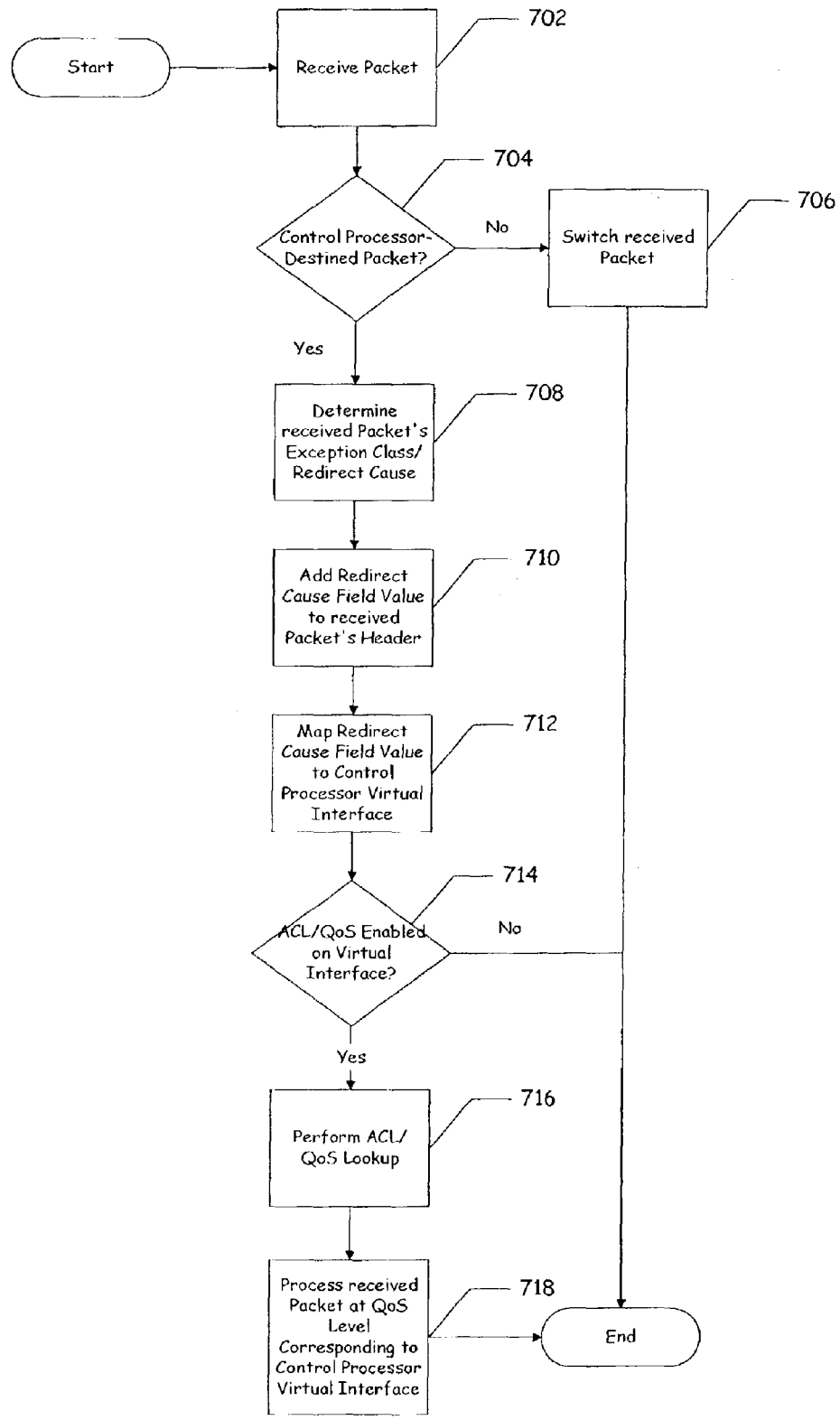
FIG. 7 illustrates a packet switching process according to an embodiment of the present invention.

FIG. 7 illustrates a packet switching process according to an embodiment of the present invention. The illustrated process embodiment begins once a packet is received (process block 702) on a line card of a network element. Thereafter, a determination is made whether or not the received packet is a control-processor-destined packet (process block 704) (e.g., a packet destined for the network element or otherwise requiring further processing for an exception, IP options, etc.). According to one embodiment, the described determination is made by a forwarding engine such as forwarding engine 204 of FIG. 2. If a determination is made that the received packet is not destined for the control processor (e.g., control processor 308 of FIG. 3), the packet may be switched (process block 706) or "forwarded" to another line card within the network element.

If it is determined that the received packet is destined for the control processor however, a redirect cause is determined for the received packet based upon data of the received packet (process block 708). According to one embodiment of the present invention, the described redirect cause is determined using a programmable mapping such as that described with respect to FIG. 4. A redirect cause field value (or other representation of the redirect cause) may then be added to the received packet's header (process block 710) and the received packet including its modified header may then be transmitted to a control processor (process block 712). According to one embodiment, the described determination, modification of the received packet's header, and transmission to a control processor is performed using a forwarding engine such as forwarding engine 204 of FIG. 2.

Once the packet has been received at the control processor, the redirect cause field value within the received packet's header is mapped to a control processor virtual interface (process block 714) as shown. According to one embodiment, the described mapping comprises a programmable mapping such as that described with respect to FIG. 6. The mapping of redirect cause/redirect cause field value to virtual interface allows existing 5-Tuple-based ACL/QoS infrastructure to be used for control-processor-destined packets. A set of access control list (ACL) and Modular QoS Command Line Interface (CLI)-based policy maps can accordingly be applied on the control processor's virtual interface(s) to determine what packets qualify for delivery to the control processor/plane and at what level of QoS.

Once a virtual interface is identified/mapped, a determination may then be made whether ACL/QoS is enabled on the identified interface (process block 716). If enabled, a traditional ACL/QoS lookup can be performed (process block 718). For platforms that perform TCAM-based lookups, utilization of the virtual interface and the existing ACL/QoS lookup infrastructure does not increase ACL/QoS lookup key size and consequently existing QoS/ACL key formats (and existing centralized or line card forwarding engines) may be used. According to another embodiment, the redirect cause field value may be utilized directly as a field in the ACL/QoS lookup.

Thereafter, the packet can be denied/policed accordingly such that the received packet is processed at a corresponding QoS level (process block 720). According to one embodiment, the described determination and ACL/QoS lookup may be performed using a lookup engine including, for example, a forwarding engine such as one of forwarding engines 204 and/or 304 of FIGS. 2 and 3, respectively, a TCAM or other memory such as memory 306 of FIG. 3, and/or a search engine, associated with the described control processor. Such a lookup engine may comprise a portion of a line card or alternatively may comprise a portion of a control card as described herein with respect to FIGS. 2 and 3, respectively.

Embodiments of the present invention have a number of distinct advantages over previously known techniques. For example, utilization of embodiments of the present invention allow the configuration of per-exception QoS features using a modular QoS command line interface (CLI) since exceptions are mapped to virtual interface. This also provides the benefit that associated ACL/QoS lookups may be performed using line card as well as control card resources. Additionally, no changes in ACL/QoS lookup key format are required to implement the described embodiments of the present invention and the redirect cause may be used by the control processor program code to expedite packet processing by directly jumping to one or more routines to handle exception packets associated with the redirect cause. Embodiments of the present invention may be further utilized to help protect a control process or denial of service (DoS) attacks.

According to one embodiment of the present invention, one or more exceptions (e.g., a TTL exception, an MTU exception, etc.) are added to a modular QoS CLI and one or more class maps are defined as follows:

class-map match-any ttl
    match ttl-exception
    class-map match-any mtu
    match mtu-exception
    One or more policy maps are similarly defined as follows:
    policy-map cp-policy
    class ttl
        rate-limit x1
    class mtu
        rate-limit x2

A user may then apply QoS policies on a control processor interface according to the described embodiment as follows:

interface control-plane 0
    service-policy in cp-policy
    Internally, each exception type or class will be converted to an associated virtual interface and the net effect will be
    access-list 101 match any any
    class-map match-any dummy
    match access-group 101
    policy-map ttl
    class dummy
        rate-limit x1
    policy-map mtu
    class dummy
        rate-limit x2
    interface ttl service-policy in ttl
interface mtu
service-policy in mtu The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A network element comprising:
   a control processor having a plurality of virtual interfaces, wherein each of said plurality of virtual interfaces is associated with a corresponding quality of service level among a plurality of quality of service levels;
   a line interface configured to:
      determine a redirect cause of a received data unit, wherein said received data unit is received by said network element, and
      in response to determining said redirect cause, modify said received data unit to include a redirect cause field value corresponding to said redirect cause, wherein said line interface comprises
         a forwarding engine configured to determine, using a first mapping, said redirect cause from an item of data of said received data unit; and
   a control processor interface circuit coupled to said control processor and to said line interface, and configured to:
      make a selection of a virtual interface from said plurality of virtual interfaces based at least in part on
         said redirect cause field value, and
         a second programmable mapping between redirect cause field values and said plurality of virtual interfaces, and
      transfer, based at least in part on said selection, said received data unit to said virtual interface.

2. The network element of claim 1, wherein each of said quality of service levels is associated with a processing bandwidth of said control processor.

3. The network element of claim 1, wherein said line interface comprises:
   a line interface configured to determine an exception class of said received data unit.

4. The network element of claim 1, further comprising:
   a lookup engine coupled to said control processor interface circuit and configured to determine a quality of service level for said virtual interface.

5. The network element of claim 4, wherein said lookup engine comprises:
   a lookup engine to determine said quality of service level using an access control list.

6. The network element of claim 4, wherein said line interface comprises said lookup engine.

7. The method of claim 1, wherein said redirect cause is one of: an IP option redirect cause, an ICMP unreachable redirect cause, Same interface redirect cause, a Unicast unknown protocol redirect cause, or a Multicast DF fail redirect cause.

8. A method comprising:
   determining a redirect cause of a received data unit, wherein said redirect cause causes said received data unit to be redirected to a control processor of a network element, wherein
      said determining is based at least in part on a first mapping applied to an item of data of said received data unit;
   in response to determining said redirect cause, modifying said received data unit to include a redirect cause field value corresponding to said redirect cause;
   selecting, in response to said redirect cause, a virtual interface from a plurality of virtual interfaces of said control processor using data of said received data unit, wherein
      each of said plurality of virtual interfaces is associated with a quality of service level, and
      said selecting is based at least in part on
         said redirect cause field value, and a second programmable mapping between redirect cause field values and said plurality of virtual interfaces; and transferring, based at least in part on said selecting, said received data unit to said virtual interface.

9. The method of claim 8, wherein said determining comprises:
determining an exception class of said received data unit.

10. The method of claim 8, further comprising:
determining a quality of service level for said virtual interface; and
processing said received data unit at said quality of service level.

11. The method of claim 10, wherein said determining comprises:
determining a quality of service level for said virtual interface using an access control list.

12. The method of claim 10, further comprising:
defining said quality of service level for said virtual interface using a modular command line interface.

13. The method of claim 10, wherein said processing comprises:
allocating processing bandwidth of said control processor to said virtual interface.

14. A non-transitory machine-readable storage medium having a plurality of instructions executable by a machine embodied therein, wherein said plurality of instructions, when executed, cause said machine to perform a method comprising:
determining a redirect cause of a received data unit, wherein said redirect cause causes said received data unit to be redirected to a control processor of a network element, wherein
said determining is based at least in part on a first mapping applied to an item of data of said received data unit;
in response to determining said redirect cause, modifying said received data unit to include a redirect cause field value corresponding to said redirect cause;
selecting, in response to said redirect cause, a virtual interface from a plurality of virtual interfaces of said control processor using data of said received data unit, wherein
each of said plurality of virtual interfaces is associated with a quality of service level, and
said selecting is based at least in part on
said redirect cause field value, and
a second programmable mapping between redirect cause field values and said plurality of virtual interfaces; and
transferring, based at least in part on said selecting, said received data unit to said virtual interface.

15. The machine-readable storage medium of claim 14, wherein said determining comprises:
determining an exception class of said received data unit.

16. The machine-readable storage medium of claim 14, further comprising:
determining a quality of service level for said virtual interface; and
processing said received data unit at said quality of service level.

17. The machine-readable storage medium of claim 16, wherein said determining comprises:
determining a quality of service level for said virtual interface using an access control list.

18. The machine-readable storage medium of claim 16, further comprising:
defining said quality of service level for said virtual interface using a modular command line interface.

19. The machine-readable storage medium of claim 16, wherein said processing comprises:
allocating processing bandwidth of said control processor to said virtual interface.

20. An apparatus comprising:
means for receiving, at a network element, a data unit from a network;
means for determining a redirect cause of a received data unit, wherein said redirect cause causes said received data unit to be redirected to a control processor of said network element, wherein said means for determining comprises
first mapping means configured to determine, using a first mapping, said redirect cause from an item of data of said received data unit;
means for, in response to determining said redirect cause, modifying said received data unit to include a redirect cause field value corresponding to said redirect cause;
means for selecting, in response to said redirect cause, a virtual interface from a plurality of virtual interfaces of said control processor using data of said received data unit, wherein
each of said plurality of virtual interfaces is associated with a quality of service level, and
said selecting is based at least in part on
said redirect cause field value, and
a second programmable mapping between redirect cause field values and said plurality of virtual interfaces; and
means for transferring, based at least in part on said selecting, said received data unit to said virtual interface.

21. The apparatus of claim 20, wherein said means for determining comprises:
means for determining an exception class of said received data unit.

22. The apparatus of claim 20, further comprising:
means for determining a quality of service level for said virtual interface; and
means for processing said received data unit at said quality of service level.

23. The apparatus of claim 22, wherein said means for determining comprises:
means for determining a quality of service level for said virtual interface using an access control list.

24. The apparatus of claim 22, further comprising:
means for defining said quality of service level for said virtual interface using a modular command line interface.

25. The apparatus of claim 22, wherein said means for processing comprises:
means for allocating processing bandwidth of said control processor to said virtual interface.

26. A method comprising:
receiving a packet at a network element;
determining a redirect cause of said packet, wherein said redirect cause causes said received data unit to be redirected to a control processor of said network element, wherein
said determining is based at least in part on a first mapping applied to an item of data of said received data unit;
in response to determining said redirect cause, modifying said packet to include a redirect cause field value corresponding to said redirect cause;

selecting, in response to said redirect cause, a quality of service level for said packet, wherein
   said selecting is based at least in part on
      said redirect cause field value, and
      a second programmable mapping between redirect cause field values and said plurality of virtual interfaces; and
transferring, based at least in part on said selecting, said packet to said control processor.

27. The method of claim 26, further comprising:
processing said packet according to said redirect cause, wherein said processing is performed by said control processor.

28. The method of claim 26, further comprising:
processing said packet, wherein said processing comprises exception processing that is performed by said control processor in response to said redirect cause.

29. The method of claim 26, further comprising:
adding a field value representing said redirect cause to a header of said packet prior to said transferring.

30. The method of claim 29, further comprising:
processing said packet, wherein said processing comprises exception processing that is performed by said control processor in response to said field value.

* * * * *